(12) United States Patent
Wylin

(10) Patent No.: US 6,344,507 B1
(45) Date of Patent: Feb. 5, 2002

(54) ANTISTATIC POLYMERIC COMPOSITIONS

(75) Inventor: Franky Wylin, Bunsbeek (BE)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/324,668

(22) Filed: Jun. 3, 1999

Related U.S. Application Data

(60) Provisional application No. 60/101,389, filed on Sep. 21, 1998.

(30) Foreign Application Priority Data

Sep. 16, 1998 (GB) ................................................ 9820083

(51) Int. Cl.$^7$ ............................ C08K 5/103; C08L 69/00
(52) U.S. Cl. ........................ 524/312; 524/306; 524/310; 524/320; 524/322; 524/910; 523/136
(58) Field of Search ................................ 524/310, 320, 524/322, 910, 306, 312; 523/136

(56) References Cited

U.S. PATENT DOCUMENTS

| 4,873,271 A | 10/1989 | Lundy et al. |
| 5,348,995 A | 9/1994 | Anderson |
| 5,356,726 A | * 10/1994 | Nishikawa et al. ... 428/694 BD |
| 5,744,626 A | 4/1998 | O'Lenick, Jr. |
| 5,891,943 A | * 4/1999 | Katsumata et al. ......... 524/310 |

FOREIGN PATENT DOCUMENTS

| EP | 0 232 838 | 8/1987 |
| JP | 55-004141 A | 1/1980 |

OTHER PUBLICATIONS

JP 60 113201 (Teijin Chem Ltd), Jun. 19, 1985, Abstract.

* cited by examiner

Primary Examiner—Tae H. Yoon

(57) ABSTRACT

The surface resistivity of polycarbonate resin is reduced and thus the antistatic properties improved by the inclusion of esters of branched fatty acids and polyhydroxylic compounds having at least one and desirably at least two free hydroxyl groups e.g. glycerol mono-iso-stearate. The reduction in surface resistivity can be acheived without a significant increase in haze or yellowness.

21 Claims, No Drawings

ANTISTATIC POLYMERIC COMPOSITIONS

This application claims benefit to Provisional Application No. 60/101,389 filed Sep. 21, 1998.

This invention relates to the use of surfactant compounds and compositions, particularly those based on esters of fatty acids, especially esters of polyhydroxylic compounds and branched fatty acids, as antistatic agents additives in polymeric, particularly polycarbonate, resins.

Polycarbonate resins are a widely used class of engineering polymer and are usually based on repeat units of a carbonate ester of a dihydroxyl aromatic compound most usually including a 1,4-phenylene (para-phenylene) group, and commonly of a bisphenolic compound such as Bisphenol A, 2,2-bis(4-dihydroxyphenyl)propane. As well as being strong and tough, polycarbonates can be fabricated as optically clear components e.g. in spectacles—polycarbonate resins are frequently used in protective spectacles and goggles even where there is no optical support for poor sight—and as windows. Polycarbonate resins are typically good insulators—they are used as dielectric materials in capacitors—and static charge on such resin surfaces may not disperse readily. Where polycarbonate resin is exploited solely for its strength and toughness, it is possible to render it anti-static by using ionic materials to increase its effective conductivity, but generally these additives give rise to opacity e.g. as haze, or discolouration e.g. as yellowing, in the compounded resins and are thus not suitable for applications where optical clarity is important. Hydrophilic antistatic agents have not generally proved to be effective in polycarbonate resin systems and in any case frequently give rise to haze, yellowing or other opacity and would thus be of limited value even if effective.

The present invention is based on the discovery that good antistatic properties can be obtained in polycarbonate resins by using esters of branched fatty acids and polyhydroxylic compounds as antistatic agents. In contrast, we have found that esters of non-branched fatty acids and polyhydroxylic compounds are much less effective as antistatic additives in polycarbonate resins.

Accordingly, the present invention provides a polycarbonate resin containing one or more esters of at least one branched fatty acid and at least one polyhydroxylic compound in an amount to provide effective antistatic activity. The invention includes the use of such esters as antistatic agents in polycarbonate resins and in particular polycarbonate resins fabricated as optically clear components such as sheets or lenses.

The term "polyhydroxylic compound" is used to refer to compounds which have two or more hydroxyl groups and which when made into esters for use in this invention retain at least one free hydroxyl group.

The antistatic agents used in this invention are esters of branched fatty acids. The fatty, usually alkyl, residue of the fatty acid is a relatively hydrophobic group which provides satisfactory compatibility with the polymer resin. Typically the branched fatty acids contain at least about 8 carbon atoms. Lower molecular weight acids generally have esters that are either not sufficiently compatible with or are too readily removed from the polymer resin to be satisfactory as antistatic agents. Desirably, the branched fatty acid contains at least 12, and more usually at least 14, carbon atoms. The branched fatty acid may contain up to 30 carbon atoms, but usually not more than 22, and more usually not more than 20, carbon atoms because such acids are not readily available and their use does not appear to give any particular advantage.

Accordingly, particularly desirable esters of branched fatty acids for use in the present invention include those of the formula (I):

$$R^1\text{—}CO_2\text{—}R^2 \qquad (I)$$

where
$R^1$ is a branched $C_{11}$ to $C_{21}$, particularly $C_{13}$ to $C_{19}$, aliphatic hydrocarbyl group, desirably an alkyl group;
$R^2$ is the residue of a polyhydroxyl compound including at least one free hydroxyl group.

Within formula (I) the group $R^1$ is desirably a branched alkyl group and within the $C_{11}$ to $C_{21}$ range given in formula (I), $R^1$ is desirably a branched $C_{13}$ to $C_{19}$ alkyl, especially a branched $C_{15}$ to $C_{19}$ alkyl, group.

The invention accordingly specifically includes polycarbonate resin containing one or more esters of the formula(I) in an amount to provide effective antistatic activity; and the use of esters of the formula(I) as antistatic agents in polycarbonate resins and in particular polycarbonate resins fabricated as optically clear components such as sheets or lenses.

Typically, the fatty acids, containing such aliphatic hydrocarbyl groups, which are used in the esters used in the invention are derived from natural sources or distillation cuts and typical commercially available materials are mixtures of compounds with a spread of chain lengths. The carbon chain lengths referred to herein are average chain lengths.

The fatty acids used in the invention are branched chain acids, more usually fatty acids having a branched alkyl chain. The branching can be at various positions along the chain for example near the carboxyl function, e.g. at the 2- or 3-position, particularly at the 2-position, or more remote from the carboxyl function e.g. about half way along the chain—corresponding to about position 9, for example from position 6 to position 12, for a $C_{18}$ alkyl group.

Generally, the fatty acids have a main chain and a branch off the main chain which is relatively short compared with the main chain. Commonly the branching can be a lower alkyl group, particularly a $C_1$ to $C_4$ alkyl group and especially a methyl or ethyl group. A particularly useful type of branched fatty acids are methyl and/or ethyl branched fatty acids. The use of such lower alkyl, especially methyl, branched fatty acids, forms a specific aspect of this invention.

Particularly suitable esters include those commercially available as esters of so-called iso-stearic acid. The commercial product iso-stearic acid is a mixture of acids having from 14 to 22, with about 2/3 having 18, carbon atoms, including short, mainly methyl but also including some ethyl, side chains, branching from the main chain mainly in the middle of the chain, typically about the 9-position e.g. from about the 6-position to about the 12-position, in an 18 carbon molecule. The assay molecular weight (e.g. by acid number) is close to that of stearic acid. "Iso-stearic acid" is a co-product (after separation and hydrogenation) from the manufacture of so-called "dimer acids" from $C_{18}$ unsaturated (mainly oleic and linoleic) fatty acids by catalytic thermal polymerisation.

Branched fatty acids for ester antistatic additives used in the invention include those of the formula (IIa):

$$[CH_3\text{-}(CH_2)_{n1}][CH_3\text{-}(CH_2)_{m1}]\text{-}CH\text{-}(CH_2)_{p1}\text{-}COOH \qquad (IIa)$$

where
n1 is from 4 to 10, particularly from 6 to 8;
m1 is from 0 to 5, particularly 0 to 3 and especially 0;

p1 is from 4 to 10; particularly from 6 to 8; and desirably n1+m1+p1 is from 10 to 18, particularly 12 to 16.

Branched acids within this group include those derived from natural sources e.g. animal or vegetable fats and waxes, particularly by reactions on unsaturated fatty acids e.g. oleic acid (octadec-9-enoic acid), to introduce branching at or near the site of unsaturation in the starting acid. Commercially available iso-stearic acid is an example of a fatty acid of the formula (IIa), in practice a mixture of fatty acids of this formula.

Further branched fatty acids for ester antistatic additives used in the invention include those of the formula (IIb):

$$[CH_3\cdot(CH_2)_{n2}][CH_3\cdot(CH_2)_{m2}]\cdot CH\cdot(CH_2)_{p2}\cdot COOH \quad (IIb)$$

where n2 is from 6 to 18, particularly from 10 to 16, especially about 14;

m2 is from 0 to 5, particularly 0 to 3;

p2 is from 0 to 3, particularly 0 to 2; and desirably n2+m2+p2 is from 10 to 18, particularly 14 to 16.

Such branched acids can be derived from synthetic sources e.g. by oxidation of alcohols made by the OXO reaction on internal linear olefins (where p2 is 0); on branched (typically 1-) olefins (where p2 depends on the position of branching in the alkyl group); on vinylidene (2,2 di-alkyl) olefins (where p2 is 1); or Guerbet alcohols (where p2 is 0); such acids are available from Condea under the trade name Isocarb e.g. Isocarb 16 ($C_{16}$), Isocarb 18 ($C_{18}$) and Isocarb 20 ($C_{20}$). Particularly where the alcohols are made by the OXO reaction, and especially by OXO reaction on linear internal olefins, the products will generally be mixtures of isomers as will the acids and thus the esters made from them.

The branched chain acids will usually be mixtures of more than one compound in the position and/or length of the side chain and/or in the total number of carbon atoms.

Practically available branched fatty acids will usually be mixtures including non-branched acid residues as well as branched acid residues. The corresponding esters which can be used in this invention will thus also include mixtures of branched and straight chain fatty acid residues. Desirably the proportion of ester having branched acid residues is at least 40%, more usually at least 50%, desirably at least 75% and may be higher e.g. more than 80% such as about 90%, by weight of the total ester additive. Thus commercially available esters of iso-stearic acid when used in this invention will typically include some corresponding esters of stearic acid (the straight chain isomer).

As is mentioned above, the source of fatty acids is commonly natural, materials especially animal and vegetable fats and waxes, which in their natural state will often contain significant levels of unsaturated fatty acids. The presence of unsaturation in antistatic agents used in polycarbonate resins may be a source of yellowing or other discoloration during incorporation of the ester additives into the polycarbonate, processing of the resin, or in subsequent use, especially in sunlight. Desirably, the level of unsaturation of fatty acid residues in esters used in the invention is low, typically less than 10%, and more usually less than 5%, and desirably not more than about 2%, of the fatty acid residues is unsaturated. Unsaturation is typically assayed by measuring the Iodine value [in $g.I_2(100$ g product under test$)^{-1}$] and for $C_{18}$ fatty acids and their near analogues these figures correspond approximately to iodine values of less than 9, more usually less than 4.5, and desirably not more than about 1.8. For fatty acids with different molecular weights the respective Iodine values will vary (inversely) with molecular weight. Iodine values may be measured on precursor fats or oils, usually fatty acid triglyceride esters, and similarly allowance for the higher molecular weight and the presence of more than one fatty residue per molecule will need to be made in converting between Iodine values and percent unsaturation. The level of unsaturation can be reduced by refining and/or hydrogenation of the source oils or fats or of the fatty acids themselves. Commercially, cosmetic grades of the fatty acids or their esters are available having low levels of unsaturation and such materials are convenient sources of material for use in this invention.

The alcohol part of the esters used in this invention is a residue of a polyhydric alcohol including at least one, and desirably from 2 to 7, particularly 2 to 5, free hydroxyl group(s), and particularly residues of polyhydroxyl compound containing from 3 to 10, especially 3 to 6, carbon atoms and having 2 to 5 free hydroxyl groups. Examples include glycols such as ethylene and propylene glycol, glycerol and polymerised derivatives of glycerol, especially diglycerol and triglycerol. In the compounds of the formula (I), the group $R^2$ is the residue of a polyhydroxyl compound including at least one free hydroxyl group and is desirably the residue of such a compound containing from 3 to 10 carbon atoms and having 2 to 5 free hydroxyl groups. Practical ester materials may include a mixture of residues of more than one polyhydroxyl compound, particularly where the polyhydroxyl compound is a polymeric (or oligomeric) material such as polymerised derivatives of glycerol. Just as unsaturation is desirably minimised in the fatty acid, the alcohol component of the ester is desirably not unsaturated and will desirably be selected to avoid introducing thermal instability. Accordingly reducing sugars are not generally useful for the alcohol part of the ester because of their poor thermal stability although non-reducing sugars or their derivatives can be used e.g. sorbitan esters of branched fatty acids, although they are not especially preferred.

The esters used in the invention have at least one free (non-esterified) hydroxyl group. Especially where the alcohol residue is of a polyhydroxyl compound only having 2 hydroxyl groups, the ester will be or include a major proportion of a mono-ester. Desirably, even where there are more hydroxyl groups in the alcohol precursor of the ester, the ester is a mono-ester or includes a high proportion of mono-ester. The proportion of mono-ester is desirably at least 50%, more usually at least 70% and particularly at least 85%. We have obtained good results using commercially available glycerol esters of iso-stearic acid, particularly those having a mono-ester content of at least 50% and up to about 90% and especially the low (less than 2%) unsaturation cosmetic grades of these esters. Where the alcohol residue is of a polyhydroxyl compound having more than 2 hydroxyl groups, esters including more than one fatty acid residue may be used, but it is still desirable that the ester(s) used have 2 or more hydroxyl groups. Generally it is desirable that the ester(s) include not more than 2 fatty acid residues even where there are 2 or more free hydroxyl groups. Examples of such materials include di-esters of polyglycerols. Thus, it is generally desirable that the number of free hydroxyl groups is at least as great as, and particularly is greater than, the number of fatty acid residues in the molecule of the antistatic agent.

In practice, the esters used in the invention are likely to be mixtures of compounds. The use of such mixtures is likely to contribute to the esters being liquid (at ambient temperature).

Especially desirable compounds of the formula (I) include those of the formula (Ia):

$$R^{1a}-CO_2-R^{2a} \quad (Ia)$$

where $R^{1a}$ is a $C_{13}$ to $C_{19}$, especially a $C_{17}$, branched alkyl group, particularly where the branch chains are methyl or ethyl groups;

$R^{2a}$ is the residue of a polyhydroxyl compound containing from 3 to 10 carbon atoms and having 2 to 5 free hydroxyl groups, especially a glyceryl residue.

The esters can be made by direct esterification of the fatty acid(s) with the polyhydroxyl compound(s) or, particularly where the polyhydroxyl compound is glycerol, by partial hydrolysis of higher esters, especially triglycerides.

The polycarbonate resins used in the invention are polyester polymers having repeat units of a carbonate ester of a dihydroxyl aromatic compound. Typically, the dihydroxyl aromatic compound is or includes a 1,4-phenylene (paraphenylene) group, and commonly it is a bisphenolic compound in which two 1,4-phenylene groups are connected through a linking group. The most common such compound used today in polycarbonate resins is Bisphenol A, 2,2-bis (4-hydroxyphenyl)propane. Combinations of two or more dihydroxyl aromatic compounds can be used in copolymeric polycarbonates and Bisphenol A is often used in combination with hydroquinone (or methyl substituted hydroquinone e.g. 1,4-dihydroxy-3-methylbenzene) as the dihydroxyl aromatic compound. As used in this invention, the polycarbonate resins are desirably polymers including the repeat unit: —O—C(O)—O—Ar— where: Ar is the residue of a dihydroxyl aromatic compound. Particularly desirably, the group Ar is a group of the formula: —Ph$^1$—R$^1$—Ph$^1$— where:

each group Ph$^1$ is independently a 1,4-phenylene group, which may be unsubstituted or substituted with one or more lower, particularly $C_1$ to $C_3$, alkyl groups and/or one or more halogen, particularly bromine, atoms; and R$^1$ is a linking group.

In such compounds, the linking group R$^1$ is particularly a group —O—; —S—; —SO$_2$— e.g. as in the residue of Bisphenol S; —C(O)— e.g. as in the residue of 4,4'-dihydroxybenzophenone; or —C(R$^2$)(R$^3$)—, where R$^2$ and R$^3$ are each independently a hydrogen atom; an lower, particularly a $C_1$ to $C_3$, alkyl group, which may be substituted with one or more halogen atoms, in particular both are methyl groups e.g. as in the residue of Bisphenol A; a cycloalkyl, particularly a cyclohexyl, group; or an aryl, particularly a phenyl, group; or R$^2$ and R$^3$ together form a divalent cyclic group e.g. a cyclohexylene or cyclopentylene group, which may be optionally alkyl substituted e.g. as in a 3,3,5-trimethylcyclohexylene group.

Particularly, for resins having low birefringence, as are especially useful in optical applications as in compact disk products, the group Ar may include spiro-linked 1,4-phenylene groups e.g. of the formula:

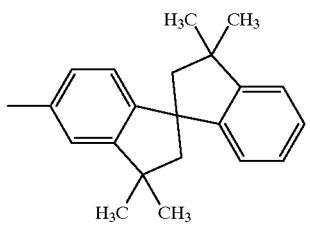

Polycarbonate resins used in this invention typically have molecular weights in the range 10000 to 100000, more usually 20000 to 60000. In practice, Melt Flow Index (MFI) is often used as a measure of molecular weight (because melt viscosity is related to molecular weight for similar polymers) and the polycarbonate resins used in this invention typically have MFI values up to 70 and usually at least 2 g. 10 min$^{-1}$, more usually from 5 to 40 g. 10 min$^{-1}$. We have obtained good results from polycarbonate resins having MFI's in the range 5 to 35 g.10 min$^{-1}$.

The surface resistivity of unfilled, untreated polycarbonate resin is typically of the order of 15 log(ohm.square$^{-1}$). To acheive satisfactory antistatic properties it is desirable to reduce the surface resistivity to not more than about 12, and desirably not more than about 11.5, log(ohm.square$^{-1}$).

As is mentioned above, polycarbonate resin containing an antistatic agent according to the invention can be fabricated as optically clear components, such as sheets or lenses. In such products, the polycarbonate resin products typically have low haze and low colour (as measured by Yellowness Index). Typically, optically clear polycarbonate resin components have Haze values [typically measured as percentage Haze on standard 2.5 mm thick injection moulded test plaques] of less than 10, more usually less than 5 and typically from 2 to 3. Inclusion of antistatic agents as used in this invention even at levels well above those needed to obtain satisfactory antistatic performance gives Haze values which are not substantially different from those of untreated polycarbonate resin and are usually within the ranges given above. For example test plaques of a polycarbonate resin containing no antistatic agent had a Haze value of 2.6 and a similar test plaques containing 4% by weight (based on the polycarbonate) of cosmetic grade glycerol mono-iso-stearate (itself about 90% iso-stearate ester)—about twice the amount needed to have a generally suitable antistatic effect—had a Haze value of 2.7. The colour [for example as measured by the Yellowness Index (YI) on standard 2.5 mm thick injection moulded test plaques] of optically clear polycarbonate resin components is also important in practice. Tests on samples as described above, including antistatic agent according to this invention, even at levels well above those necessary to achieve satisfactory antistatic properties, typically give values of about 2—substantially the same as untreated polycarbonate resin.

The invention accordingly includes polycarbonate resin having:

1. a surface resitivity of not more than 12, preferably not more than 11.5, log(ohm.square$^{-1}$);
2. a Haze units value of not more than 5, more usually from 1.5 to 3.5 and preferably 2 to 3; and optionally but desirably
3. a Yellowness Index of not more than 5, more usually from 1.5 to 3.5 and preferably 1.8 to 3.

In particular the invention includes polycarbonate resin having such surface resitivity; Haze units value; and Yellowness Index values in which the polycarbonate is rendered antistatic by the inclusion of at least one esters of at least one branched fatty acid and at least one polyhydroxylic compounds; especially where the ester is at least one compound of the formula (I) or (a) as defined above.

Suitable commercial materials are available under the trade designations Lexan from General Electric, Makrolon from Bayer, Calibre from Dow and Panlite from Idemitsu.

The amount of the antistatic agent used in the polycarbonate resin formulations according to this invention will be sufficient to provide an antistatic effect. Typically the minimum amount to be effective is about 0.2% by weight of the formulation, although the amount used will usually be at least 0.25%. The maximum amounts will typically be about 5.0% by weight of the formulation, and amounts above about 3% offer little further benefit and will not in general be used. We have obtained good results using amounts in the range 0.5 to 2.5% by weight of the formulation. Thus typical proportions of antistatic agent used based on the polycarbonate resin are:

|  | % by weight |
|---|---|
| Broad | 0.2 to 5 |
| Desirable | 0.25 to 3 |
| Optimum | 0.5 to 2.5 |

Desirably the amount of compound(s) of the formula (I) above is within these ranges.

Usually it will be convenient to incorporate the antistatic agent uniformly in the polycarbonate resin. However, it may be desirable to have a higher concentration of the antistatic agent (than in the remainder of the polycarbonate resin) in one or more layers [high concentration layer(s)] at or near the surface of the polycarbonate resin product. The concentration of antistatic agent in such high concentration layer(s) may be similar to the concentrations indicated above for uniform incorporation, thus using less antistatic agent overall.

Alternatively, the concentration in high concentration layer(s) may be higher than would generally be used for uniform incorporation e.g. from 2.5 to 10%, particularly 3 to 7% by weight of the polycarbonate resin in the high concentration layer(s). The use of such high concentration layer(s) can give a longer lasting antistatic effect without overall using uneconomically large amounts of antistatic additive. Where the concentration in the high concentration layer(s) is substantially above that used in uniformly treated polycarbonate resin, it will often be in a layer just below the exposed surface of the polycarbonate resin product and may have overlying it a thin layer that has a more normal concentration of antistatic additive. Such overlying thin layers are often only from 1 to 5 $\mu$m e.g. 1.5 to 3 $\mu$m, thick and the underlying high concentration layer will typically be from 5 to 100 $\mu$m, particularly 10 to 50 $\mu$m thick.

Multilayer structures of these types can be fabricated e.g. by coextrusion to give multilayer film products, or by coating particularly by extrusion or coextrusion coating onto suitable substrates.

The polymer resin compositions can and typically will usually include other components typically as minor constituents usually totalling less than about 10% of the formulation, such as antioxidants especially UV stabilisers, and mould release agents.

Suitable antioxidants are particularly UV stabilisers such as those sold under the trade names Tinuvin 234, Tinuvin 360, Tinuvin 1577 and Irganox 1076 by Ciba and are used typically in amounts as recommended by the respective manufacturers and generally in the range 0.05 to 1%, particularly 0.1 to 0.5%, by weight of the overall composition. Combinations of antioxidants/UV stabilisers can be used as is common is the art using total amounts of such additives typically from about 0.5 to 1% by weight of the overall composition.

Mould release agents are typically fatty acid monoglycerides such as glycerol mono-stearate. The levels used are typically from 0.1 to 0.5% by weight of the resin formulation. The branched fatty acid esters used in this invention are generally used at much higher levels that is usually appropriate for mould release agents and it appears that the antistatic additives provide mould release properties. In any event we have not found it necessary to use separate mould release agents although they can be used if desired.

Of course, where the intended end use of the polycarbonate resin formulation is in or as an optically clear component, product or material, any additives will be selected so that they do not interfere with the desired optical properties of the component, product or material.

We have found that the antistatic agents used in this invention can readily be incorporated into the polycarbonate resin which it is desired to render antistatic. The antistatic can be incorporated into the resin by generally conventional methods, typically by including the antistatic as a component in formulating the resin before moulding or casting and in particular by melt blending techniques, for example using Banbury mixers or extruders. For example, the antistatic agent additive can be melt blended into the polymer resin in an extruder, with the additive being fed into the extruder premixed with the polycarbonate resin e.g. by dry blending polycarbonate resin granules with powdered additive or by mixing granules of polycarbonate resin and of additive masterbatch in a similar polymer, or by being fed as a side stream into the extruder as the molten polycarbonate resin proceeds through it. The blended material can be granulated e.g. by extrusion and cutting e.g. for subsequent manufacture into desired forms such as sheet e.g. windows, and moulded products, including optical components such as lenses. Masterbatches of the antistatic agent in polycarbonate resin can be made as granules by such methods and the polycarbonate polymer resin base of the masterbatch need not be the same as the main polycarbonate polymer resin of the product formulation (but in practice will be miscible with it).

The polymer products of this invention incorporating the antistatic additive can be used to make a variety of products as typically made from the polymer resin materials. In particular we expect that the compositions of this invention will find application in self-supporting films for packaging, as film coatings on, particularly sheet or tile, substrates, and in polymer resin formulations for casting and moulding.

When the polycarbonate resins formulated including an antistatic agent according to the invention are used in making moulded products e.g. sheet products (including lenses and similar optical components), the antistatic agent will typically be used to inhibit or prevent surface dust pick up and this can be a very useful feature of such products. Even where antistatic performance is not particularly important in, particularly moulded, end products, intermediate processing may be simplified if the polycarbonate resin is treated according to the invention. The lower surface resistivity may well reduce the extent of static build up and thus the risk of getting electric shocks from material being formed.

The following Examples illustrate the invention. All parts and percentages are by weight unless otherwise stated.

Materials used

| Code | Description |
|---|---|
| Polycarbonate resins | |
| PC1 | Makrolon 2400 ex. Bayer |
| Antistatic additives | |
| CA1 | glycerol mono-stearate - 90% mono ester |
| CA2 | triglycerol mono-oleate |
| CA3 | glycerol tri-iso-stearate |

-continued

Materials used

| Code | Description |
|---|---|
| A1 | glycerol mono-iso-stearate - 50% mono ester low unsaturation cosmetic grade |
| A2 | glycerol mono-iso-stearate - 90% mono ester low unsaturation cosmetic grade |
| A3 | diglycerol mono-iso-stearate |
| A4 | diglycerol di-iso-stearate |

Test Methods

The tests below were carried out on 2.5 mm thick injection moulded test plates conditioned for at least 1 day and maintained for the length of the test under controlled temperature and humidity conditions (20° C. 50% RH).

Surface Resistivity (SR)—was measured after 1 day (1D), 1 week (1W), 2 weeks (2W), 4 weeks (4W), 2 months (2M) and 6 months (6M) using a Keithly model 6517A meter. The results are quoted in $\log(\text{ohm.square}^{-1})$.

Haze—was measured on standard 2.5 mm thick injection moulded test plaques 1 week after manufacture using a Hunterlab model D25PC2 colorimeter and results are quoted as percentage Haze (Haze %)

Yellowness Index (YI)—was measured on standard 2.5 mm thick injection moulded test plaques 1 week after manufacture using a Hunterlab model D25PC2 colorimeter.

EXAMPLE 1

Two glycerol iso-stearate antistatic agents were formulated into polycarbonate resin, at 2% by weight of the resin, to give compositions 1.1 and 1.2 of the invention. The compositions were mixed in the barrel of an extruder and were injection moulded as 2.5 mm thick test plates. Comparative samples were also made up without any antistatic additive and using additives CA1, CA2 and CA3. The formulations and testing results are set out in Table 1 below. These results clearly show that the products of the invention provide good antistatic effect without significant adverse effects on haze or colour of the polycarbonate resin.

EXAMPLE 2

Further test plates were made generally as described in Example 1, but using antistatic additives A3 and A4. The formulations and testing results are included in Table 1.

TABLE 1

| Ex. No. | PC Resin | Antistat Type | (wt %) | SR [log(ohm.square$^{-1}$)] 1D | 1W | 2W | 4W | 2M | 6M | Haze (%) | YI |
|---|---|---|---|---|---|---|---|---|---|---|---|
| 1.1C | PC1 | — | 0 | 15.7 | 15.8 | 15.7 | 15.8 | 15.8 | 15.8 | 2.6 | 2.1 |
| 1.2C | PC1 | CA1 | 2 | 12.7 | 12.6 | 14.7 | 14.8 | — | — | 2.8 | 3.4 |
| 1.3C | PC1 | CA2 | 2 | 12.7 | — | 12.6 | 12.5 | — | — | 3.1 | 4.2 |
| 1.4C | PC1 | CA3 | 2 | 13.5 | 13.7 | 14 | 14.1 | — | — | 3.6 | 4.5 |
| 1.1 | PC1 | A1 | 2 | 11.8 | — | 12 | 11.9 | 11.7 | 11.5 | 2.7 | 2.2 |
| 1.2 | PC1 | A2 | 2 | 11.7 | — | 11.5 | 11.4 | 11.3 | — | 2.7 | 2.2 |
| 2.1 | PC1 | A3 | 2 | 12.5 | 12.1 | 12 | 12 | 11.7 | | 2.9 | 2.2 |
| 2.2 | PC1 | A4 | 2 | 13 | 13 | 12.9 | 13.2 | 13.1 | | | |

EXAMPLE 3

Example 1.1 was re-run as Example 2.1 except that the proportion of antistatic agent A1 was 4%, significantly more than would normally be uniformly incorporated, in order to examiner the haze and colour performance at higher additive levels. The surface resistivity was not systematically tracked but spot measurements indicated that the performance was very similar to Example 1.1. For Example 2.1, the Haze % was 2.7 and the YI 2.3. These data indicate that the antistatic additives used in this invention contribute little, if any, adverse haze or colour to polycarbonate resins in which they are used.

What is claimed is:

1. A polycarbonate resin comprising one or more esters comprising:
   (i) at least one branched $C_{12}$ to $C_{30}$ fatty acid residue; and
   (ii) at least one polyhydroxylic compound residue wherein said ester is present in an amount to provide effective antistatic activity and
wherein said ester is compatible with the polycarbonate resin.

2. A polycarbonate resin comprising an ester of the formula (I):

$$R^1—CO_2—R^2 \qquad (I)$$

where
   $R^1$ is a branched $C_{11}$ to $C_{21}$ aliphatic hydrocarbyl group; and
   $R^2$ is the residue of a polyhydroxyl compound including at least one free hydroxyl group
wherein said ester is present in an amount to provide effective antistatic activity.

3. A polycarbonate resin as claimed in claim 2 wherein $R^1$ is a $C_{15}$ to $C_{19}$ branched alkyl group.

4. A polycarbonate resin as claimed in claim 2 wherein $R^2$ is the residue of a polyhydroxyl compound containing from 3 to 10, carbon atoms and having 2 to 5 free hydroxyl groups.

5. A polycarbonate resin as claimed in claim 1 wherein the ester is included at from 0.2 to 5% by weight of the polycarbonate resin.

6. A polycarbonate resin as claimed in claim 1 wherein said one or more esters includes a mixture of esters.

7. A polycarbonate resin as claimed in claim 1 wherein the one or more esters include glycerol mono-iso-stearate.

8. Polycarbonate resin as claimed in claim 6 which is rendered antistatic by the inclusion of from 0.2 to 5% by weight of the polycarbonate resin of at least one ester of the formula (Ia)

$$R^{1a}—CO_2—R^{2a} \qquad (Ia)$$

where
$R^{1a}$ is a $C_{13}$ to $C_{19}$ branched alkyl group; and
$R^{2a}$ is the residue of a polyhydroxyl compound containing from 3 to 10 carbon atoms and having 2 to 5 free hydroxyl groups.

9. Polycarbonate resin as claimed in claim 1 having:
(i) a surface resitivity of not more than 12 log (ohm.square-1);
(ii) a Haze units value of not more than 5;
(iii) a Yellowness index of not more than 5.

10. A polycarbonate resin according to claim 2 wherein $R^2$ is the residue of a polyhydroxyl compound containing from 3 to 6 carbon atoms and having 2 to 5 free hydroxyl groups.

11. A polycarbonate resin comprising one or more esters comprising:
(i) at least one branched fatty acid residue represented by formula IIa:

$$[CH_3(CH_2)_{n1}][CH_3(CH_2)_{m1}]CH(CH_2)_{p1}— \qquad (IIa)$$

where
n1 is from 4 to 10;
m1 is from 0 to 5;
p1 is from 4 to 10; and
(ii) at least one polyhydroxylic compound residue
wherein said ester is present in an amount to provide effective antistatic activity and wherein said ester is compatible with the polycarbonate resin.

12. A polycarbonate resin comprising one or more esters comprising
(i) at least one branched fatty acid residue and
(ii) at least one polyhydroxylic compound residue selected from the group consisting of glycerol, di-glycerol and tri-glycerol,
in an amount to provide effective antistatic activity.

13. A polycarbonate resin comprising one or more esters comprising
(i) at least one branched fatty acid residue of iso-stearic acid and
(ii) at least one polyhydroxylic compound
in an amount to provide effective antistatic activity.

14. A polycarbonate resin comprising one or more esters comprising
(i) at least one branched fatty acid residue of iso-stearic acid and
(ii) at least one polyhydroxylic compound selected from the group consisting of glycerol, di-glycerol and tri-glycerol,
in an amount to provide effective antistatic activity.

15. A polycarbonate resin according to claim 1 wherein the polycarbonate resin is an unfilled resin.

16. A polycarbonate resin according to claim 2 wherein the polycarbonate resin is an unfilled resin.

17. A polycarbonate resin according to claim 9 wherein the polycarbonate resin is an unfilled resin.

18. A polycarbonate resin according to claim 11 wherein the polycarbonate resin is an unfilled resin.

19. A polycarbonate resin according to claim 12 wherein the polycarbonate resin is an unfilled resin.

20. A polycarbonate resin according to claim 13 wherein the polycarbonate resin is an unfilled resin.

21. A polycarbonate resin according to claim 14 wherein the polycarbonate resin is an unfilled resin.

* * * * *